United States Patent
Jin et al.

(10) Patent No.: US 11,414,343 B2
(45) Date of Patent: Aug. 16, 2022

(54) REVERSE ION EXCHANGE PROCESS FOR LITHIUM CONTAINING GLASS

(71) Applicant: CORNING INCORPORATED, Corning, NY (US)

(72) Inventors: Yuhui Jin, Painted Post, NY (US); Qiao Li, Horseheads, NY (US); Wei Sun, Painted Post, NY (US)

(73) Assignee: CORNING INCORPORATED, Corning, NY (US)

( * ) Notice: Subject to any disclaimer, the term of this patent is extended or adjusted under 35 U.S.C. 154(b) by 191 days.

(21) Appl. No.: 16/573,294

(22) Filed: Sep. 17, 2019

(65) Prior Publication Data
US 2020/0095162 A1   Mar. 26, 2020

Related U.S. Application Data

(60) Provisional application No. 62/767,668, filed on Nov. 15, 2018, provisional application No. 62/733,844, filed on Sep. 20, 2018.

(51) Int. Cl.
*C03C 21/00* (2006.01)
*C03C 3/085* (2006.01)

(52) U.S. Cl.
CPC ............ *C03C 21/002* (2013.01); *C03C 3/085* (2013.01)

(58) Field of Classification Search
None
See application file for complete search history.

(56) References Cited

U.S. PATENT DOCUMENTS

| | | | | |
|---|---|---|---|---|
| 2013/0004758 A1* | 1/2013 | Dejneka | | C03C 3/087 428/220 |
| 2013/0133745 A1* | 5/2013 | Hamilton | | C03C 21/001 136/260 |
| 2014/0178691 A1* | 6/2014 | Kreski | | C03C 21/002 65/30.14 |
| 2015/0225287 A1* | 8/2015 | Amin | | A01N 25/08 428/410 |
| 2015/0239772 A1* | 8/2015 | Baker | | C03C 10/0054 428/410 |
| 2016/0280589 A1 | 9/2016 | Beall et al. | | |
| 2018/0044231 A1* | 2/2018 | Amin | | C03C 4/18 |
| 2019/0112220 A1* | 4/2019 | Alder | | C03C 3/087 |
| 2019/0389764 A1* | 12/2019 | Andrews | | C03C 3/085 |
| 2021/0080778 A1* | 3/2021 | Hatano | | C03C 15/00 |

FOREIGN PATENT DOCUMENTS

| WO | WO-2014192097 A1 * | 12/2014 | ............. C03C 17/30 |
|---|---|---|---|
| WO | 2018143991 A1 | 8/2018 | |
| WO | WO-2018143991 A1 * | 8/2018 | ........... C03C 21/002 |

OTHER PUBLICATIONS

International Search Report and Written Opinion of the European International Searching Authority; PCT/US2019/051403; dated Jan. 9, 2020; 11 Pgs.
Yuan et al; "Effects of Temperature on Conversion of Li2CO3 To LiOH in Ca(OH)2 Suspension" Particuology 34 (2017) 97-102.

* cited by examiner

*Primary Examiner* — Lisa L Herring
(74) *Attorney, Agent, or Firm* — Kevin M. Johnson

(57) ABSTRACT

A method of reworking lithium containing ion exchanged glass-based articles is provided. The method includes a reverse ion exchange process that returns the glass-based article to approximately the composition of the glass from which the glass-based article was produced, before being subjected to ion exchange.

17 Claims, 2 Drawing Sheets

REVERSE ION EXCHANGE PROCESS FOR LITHIUM CONTAINING GLASS

CROSS-REFERENCE TO RELATED APPLICATIONS

This application claims the benefit of priority under 35 U.S.C. § 119 of U.S. Provisional Application Ser. No. 62/767,668 filed on Nov. 15, 2018 and U.S. Provisional Application Ser. No. 62/733,844 filed on Sep. 20, 2018, the content of each are relied upon and incorporated herein by reference in their entirety.

BACKGROUND

The disclosure relates to a process for reversing the ion exchange of a lithium containing glass-based article.

Glass-based articles are widely used in electronic devices as cover plates or windows for portable or mobile electronic communication and entertainment devices, such as cellular phones, smart phones, tablets, video players, information terminal (IT) devices, laptop computers and the like, as well as in other applications. As glass-based articles become more widely used, it has become more important to develop strengthened glass-based articles having improved survivability, especially when subjected to tensile stresses and/or relatively deep flaws caused by contact with hard and/or sharp surfaces.

The chemical strengthening process may produce glass-based articles with surface defects, such as scratches, or undesired stress profiles. For economic reasons, it is desirable to rework glass-based articles with such defects to increase the yield of strengthened glass-based articles with the desired characteristics. However, removing material from the surface of strengthened glass-based articles necessitates the re-ion exchange of the material to achieve the desired surface compressive stress characteristics, which can produce undesired dimensional changes or warping of the glass-based article. Additionally, the re-ion exchange step may produce undesired internal diffusion of the ions introduced during the chemical strengthening procedure and relaxation of the stress in the glass-based article. Thus, there is a need for a process to increase the yield of chemically strengthened articles by enabling the rework of chemically strengthened glass-based articles with a non-desired stress profile or surface defects such that the resulting glass-based articles exhibit a desired stress profile and surface compressive stress and to do so in a manner that does not introduce addition defects or undesirable affects.

SUMMARY

Disclosed herein is a first aspect comprising reverse ion exchanging an ion exchanged glass-based article in a reverse ion exchange medium to produce a reverse ion exchanged glass-based article, wherein the reverse ion exchange medium comprises a lithium salt, a multivalent metal salt, and carbonate ions.

A second aspect according to the first aspect, wherein the lithium salt is lithium nitrate.

A third aspect according to any preceding aspect, wherein the multivalent metal salt is selected from the group consisting of nitrates, bromides, chlorides, sulfates and combinations thereof.

A fourth aspect according to any preceding aspect, wherein metal of the multivalent metal salt is selected from the group consisting of calcium, magnesium, strontium, barium, iron, aluminum and combinations thereof.

A fifth aspect according to any preceding aspect, wherein the reverse ion exchange medium comprises the multivalent metal salt in an amount in a range from 0.1 wt % to 5 wt %.

A sixth aspect according to any preceding aspect, wherein the reverse ion exchange medium further comprises a sodium salt.

A seventh aspect according to any preceding aspect, wherein the reverse ion exchange medium comprises the sodium salt in an amount in a range from 30 wt % to 90 wt %.

An eighth aspect according to any preceding aspect, wherein the reverse ion exchange medium comprises the lithium salt in an amount in a range from 5 wt % to 50 wt %.

A ninth aspect according to any preceding aspect, wherein the reverse ion exchange medium further comprises a potassium salt.

A tenth aspect according to any preceding aspect, wherein the reverse ion exchange medium comprises the potassium salt in an amount in a range from 0 wt % to 10 wt %.

An eleventh aspect according to any preceding aspect, wherein the reverse ion exchange medium further comprises silicic acid.

A twelfth aspect according to any preceding aspect, wherein the reverse ion exchange medium comprises the silicic acid in an amount in a range from 0.1 wt % to 4 wt %.

A thirteenth aspect according to any preceding aspect, wherein the reverse ion exchange medium is at a temperature of greater than or equal to 350° C. to less than or equal to 550° C.

A fourteenth aspect according to any preceding aspect, wherein the reverse ion exchange in the reverse ion exchange medium extends for a period of greater than or equal to 1 hours to less than or equal to 48 hours.

A fifteenth aspect according to any preceding aspect, wherein after the reverse ion exchange a surface of the glass-based article has a surface roughness (Ra) of less than 5 nm.

A sixteenth aspect according to any preceding aspect, wherein after the reverse ion exchange a surface of the glass-based article has a transmission haze of less than 0.1%.

A seventeenth aspect according to any preceding aspect, wherein after the reverse ion exchange a surface of the glass-based article has a transmission haze of less than 0.05%.

A reverse ion exchanged glass-based article produced by any of the preceding aspects.

These and other aspects, advantages, and salient features will become apparent from the following detailed description, the accompanying drawings, and the appended claims.

DETAILED DESCRIPTION

Figure 1:
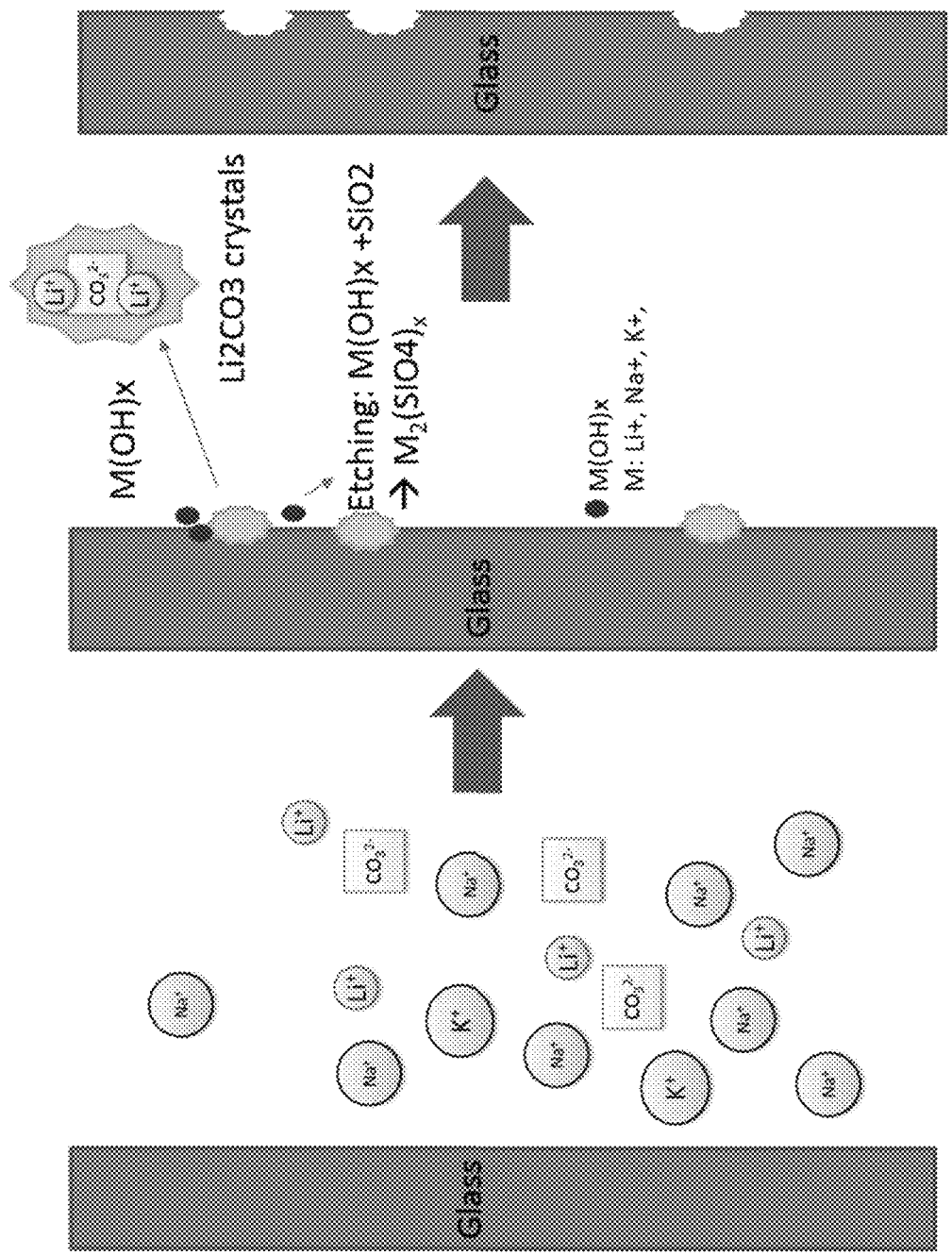
FIG. 1 is a diagram showing how haze is formed on the surface of a glass-based article.

In the following description, like reference characters designate like or corresponding parts throughout the several views shown in the figures. It is also understood that, unless otherwise specified, terms such as "top," "bottom," "outward," "inward," and the like are words of convenience and are not to be construed as limiting terms. Unless otherwise specified, a range of values, when recited, includes both the upper and lower limits of the range as well as any ranges therebetween. As used herein, the indefinite articles "a," "an," and the corresponding definite article "the" mean "at least one" or "one or more," unless otherwise specified. It also is understood that the various features disclosed in the specification and the drawings can be used in any and all combinations.

As used herein, the term "glass-based article" is used in its broadest sense to include any object made wholly or partly of glass, including glass ceramics. Unless otherwise specified, all compositions described herein are expressed in terms of mole percent (mol %), and the constituents are provided on an oxide basis.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue. For example, a glass that is "substantially free of $K_2O$" is one in which $K_2O$ is not actively added or batched into the glass, but may be present in very small amounts as a contaminant. It is intended that when a value is disclosed herein utilizing the modifier "about," the exact value is also disclosed.

Compressive stress (including surface CS) is measured by surface stress meter (FSM) using commercially available instruments such as the FSM-6000, manufactured by Orihara Industrial Co., Ltd. (Japan). Surface stress measurements rely upon the accurate measurement of the stress optical coefficient (SOC), which is related to the birefringence of the glass. SOC in turn is measured according to Procedure C (Glass Disc Method) described in ASTM standard C770-16, entitled "Standard Test Method for Measurement of Glass Stress-Optical Coefficient," the contents of which are incorporated herein by reference in their entirety.

Referring to the drawings in general, it will be understood that the illustrations are for the purpose of describing particular embodiments and are not intended to limit the disclosure or appended claims thereto. The drawings are not necessarily to scale, and certain features and certain views of the drawings may be shown exaggerated in scale or in schematic in the interest of clarity and conciseness.

Described herein are methods for reverse ion exchanging glass-based articles. For example, the reverse ion exchange methods may be employed as part of a process for reworking chemically strengthened glass-based articles which exhibit a manufacturing defect. The defects may include surface defects or undesired stress profiles. Surface defects may be the result of handling during the manufacturing process, and may include scratches, dents, and dimples. An undesired stress profile may result from ion exchange conditions that are outside of specifications.

Surface defects may be removed from a chemically strengthened glass-based article by removing material from the surface, such as by polishing or etching. The removal of material from the surface of the glass-based article also removes a portion of the glass-based article that is under compressive stress. Thus, the glass-based article must be subjected to an additional ion exchange to achieve the desired stress profile after removing material from the surface. The additional ion exchange may negatively impact the strength and dimensional stability of the glass-based article. For example, the additional ion exchange may produce internal diffusion and stress relaxation in the glass-based article, as well as result in part growth that renders the glass-based article outside of desired dimensional tolerances.

The methods described herein include a reverse ion exchange step that serves to return the chemically strengthened glass-based articles to approximately the composition of the glass-based article prior to the chemical strengthening ion exchange. In some embodiments, the reverse ion exchange step employs a reverse ion exchange medium that comprises a lithium salt and a multivalent metal salt. In some embodiments, carbonate ions are also present in the reverse ion exchange medium. It has been found that the presence of the multivalent metal salt minimizes the reaction of lithium from the lithium salt with the carbonate ions to form lithium carbonate because the metal ions from the multivalent metal salt having a stronger binding constant with the carbonate than lithium ions. As explained in more detail below with reference to FIG. 1, it is believed that if too much lithium carbonate is formed it will adhere to the glass and result in the glass-based article developing areas of haze. Thus, the presence of the multivalent metal salt in the reverse ion exchange bath minimizes the haze issue caused by the presence of carbonate ion contaminants in the reverse ion exchange medium.

FIG. 1 illustrates how haze can form on the glass-based article during the reverse ion exchange process. In some embodiments, the reverse ion exchange medium may contain a lithium salt (such as lithium nitrate), a sodium salt (such as sodium nitrate), a potassium salt (such as potassium nitrate) and carbonate contaminates (such as sodium carbonate). The carbonate contaminant may be a contaminate from the raw batch materials used in forming the reverse ion exchange medium, from organic contaminants present on the surface of the glass-based article when placed in the reverse ion exchange medium (for example if the glass-based article was not washed beforehand to remove such contaminants), or from the atmosphere. FIG. 1, illustrates the presence of contaminate carbonate ions, lithium ions, sodium ions, and potassium ions in the reverse ion exchange medium and how the carbonate ions and lithium ions will react to form lithium carbonate. In some embodiments, the formation of the lithium carbonate could be from the following reaction:

$$2LiNO_3 + Na_2CO_3 \rightarrow Li_2CO_3 + 2NaNO_3 \qquad (1)$$

The lithium carbonate crystals precipitate out of the medium and grow on the surface of the glass-based article when the lithium carbonate in the medium exceeds its solubility in the medium. Without be bound by theory, it is believed that the reverse ion exchange medium reverses the previous ion exchange and also etches away a portion of the glass-based article. For example, in some embodiments, the glass etching is the result of the following reaction:

$$2M(OH)_x + xSiO_2 \rightarrow M_2(SiO_4)_x + xH_2O \qquad (2)$$

Wherein M=Lithium, Sodium, or Potassium. When the lithium carbonate crystals are present on the surface of the glass-based article the surface is selectively etched around the lithium carbonate crystals, such that when the crystals are removed, there are dents in the surface that induce the formation of haze when illuminated with light.

Figures 2A, 2B, 2C, 2D:
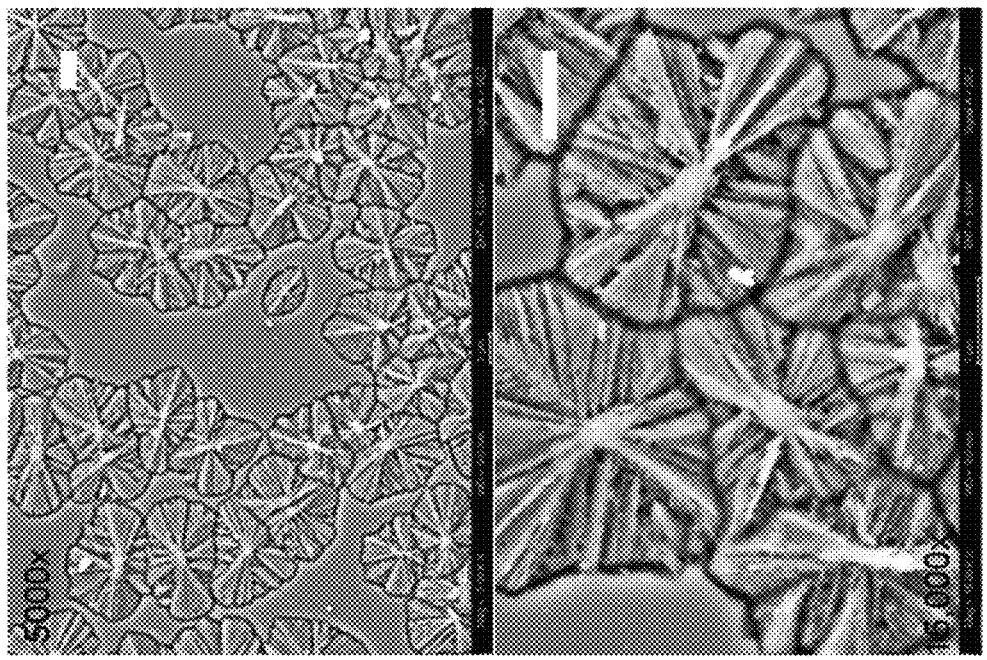
FIGS. 2A-2D are scanning electron microscope (SEM) images at varying magnifications of a surface of glass-based article with haze.

A proof of concept experiment was run with a reverse ion exchange medium that had no carbonate contamination (34.5 wt % $LiNO_3$, 64.5 wt % $NaNO_3$, and 1 wt % $KNO_3$) and one where there was carbonate contamination (34.5 wt % $LiNO_3$, 64.5 wt % $NaNO_3$, 1 wt % $KNO_3$, and 0.1 wt % $Na_2CO_3$). Both samples were exposed to light illumination on the edge having a wavelength between 350 nm to 700 nm and only the samples exposed to the medium with the carbonate showed haze, indicating that the carbonate contamination contributed to the haze formation. FIG. 2A-D are scanning electron microscope (SEM) images of the glass-based article immersed in the medium with the carbonate contamination and show the presence of micro/nanostructures on the surface causing the haze issue. FIG. 2A is an image at 1000 times magnification and the scale bar in the upper right corner is 10 microns; FIG. 2B is an image at 5000 times magnification and the scale bar in the upper right corner is 1 micron; FIG. 2C is an image at 10,000 times magnification and the scale bar in the upper right corner is 1 micron, FIG. 2D is an image at 15,000 times magnification and the scale bar in the upper right corner is 1 micron.

In some embodiments, multivalent metal salt included in the reverse ion exchange medium may be chosen from nitrates, chlorides, bromides, sulfates, phosphates and combinations thereof. The multivalent metal in the salt may be chosen from calcium, barium, magnesium, strontium, iron, aluminum, and combinations thereof. In some embodiments, the multivalent salt may be any multivalent metal salt that undergoes substantially no ion exchange and dissolves at the operating temperature of the bath. Without being bound by theory, it is believed that the metal from the multivalent salt has a greater binding constant with carbonate ions than lithium. For example, the following exemplary reactions may occur when calcium, barium, or magnesium salts are present in the reverse ion exchange medium, all of which reduce the amount of lithium carbonate in the medium:

$$Ca^{2+} + Li_2CO_3 \rightarrow CaCO_3 + 2Li^+ \quad \text{or} \quad Ca^{2+} + CO_3^{2-} \rightarrow CaCO_3 \quad (3)$$

$$Ba^{2+} + Li_2CO_3 \rightarrow BaCO_3 + 2Li^+ \quad \text{or} \quad Ba^{2+} + CO_3^{2-} \rightarrow BaCO_3 \quad (4)$$

$$Mg^{2+} + Li_2CO_3 \rightarrow MgCO_3 + 2Li^+ \quad \text{or} \quad Mg^{2+} + CO_3^{2-} \rightarrow MgCO_3 \quad (5)$$

The carbonates formed with the metal ion from the multivalent metal salt have lower solubility in the reverse ion exchange medium than lithium carbonate so they precipitate out of the bath and sink to the bottom of the tank holding the medium. Thus, unlike the lithium carbonate, the carbonates formed with the metal ion from the multivalent metal salt are less likely to grow on the surface of the glass-based article thereby reducing the possibility of haze issues.

As noted above, the haze formation is based on whether lithium carbonate crystals precipitate out and the precipitation of the lithium carbonate crystals is based on the solubility of lithium carbonate in the reverse ion exchange medium. The lithium carbonate solubility is determined by its equilibrium constant (K) in the medium, wherein $K=[Li^+]^2[CO_3^{2-}]$. K is temperature dependent and medium composition dependent (such as the potassium to sodium ratio). Thus, haze may be formed when $[CO_3^{2-}] > K/[Li^+]^2$ and accordingly, in some embodiments the medium conditions are tailored to prevent haze such that $[CO_3^{2-}] < K/[Li^+]^2$. The $[Li^+]^2$ and $[CO_3^{2-}]$ concentrations can be measured by ion chromotography to calculate K.

The reverse ion exchange bath may include the multivalent metal salt in any appropriate amount to minimize or eliminate the formation of lithium carbonate. In embodiments, the reverse ion exchange medium may include the multivalent metal salt in a range from 0.1 wt % to 5 wt %, 0.1 wt % to 4 wt %, 0.1 wt % to 3 wt %, 0.1 wt % to 2 wt %, 0.1 wt % to 1 wt %, 0.5 wt % to 5 wt %, 0.5 wt % to 4 wt %, 0.5 wt % to 3 wt %, 0.5 wt % to 2 wt %, 0.5 wt % to 1 wt %, 1 wt % to 5 wt %, 1 wt % to 4 wt %, 1 wt % to 3 wt %, 1 wt % to 2 wt %, 2 wt % to 5 wt %, 2 wt % to 4 wt %, 2 wt % to 3 wt %, 3 wt % to 5 wt %, 3 wt % to 4 wt %, 4 wt % to 5 wt %, and any and all sub-ranges formed from the foregoing endpoints.

In some embodiments, the lithium salt in the reverse ion exchange bath may be lithium nitrate ($LiNO_3$). In some embodiments, the reverse ion exchange bath may include any appropriate amount of lithium salt sufficient to produce the desired degree of reverse ion exchange. In some embodiments, the reverse ion exchange bath may include $LiNO_3$ in a range from greater than or equal to 5 wt % to less than or equal to 50 wt %, 5 wt % to 40 wt %, 5 wt % to 30 wt %, 5 wt % to 20 wt %, 10 wt % to 50 wt %, 10 wt % to 40 wt %, 10 wt % to 30 wt %, 10 wt % to 20 wt %, 20 wt % to 50 wt %, 20 wt % to 40 wt %, 20 wt % to 30 wt %, 30 wt % to 50 wt %, 30 wt % to 40 wt %, 40 wt % to 50 wt %, and any and all sub-ranges formed by the foregoing end points.

In some embodiments, the reverse ion exchange bath may additionally include a sodium salt, such as sodium nitrate ($NaNO_3$). The reverse ion exchange bath may contain $NaNO_3$ in a range from greater than or equal to 30 wt % to less than or equal to 90 wt %, 30 wt % to 80 wt %, 30 wt % to 70 wt %, 30 wt % to 60 wt %, 30 wt % to 50 wt %, 40 wt % to 90 wt %, 40 wt % to 80 wt %, 40 wt % to 70 wt %, 40 wt % to 60 wt %, 40 wt % to 50 wt %, 50 wt % to 90 wt %, 50 wt % to 80 wt %, 50 wt % to 70 wt %, 50 wt % to 60 wt %, 50 wt % to 90 wt %, 50 wt % to 80 wt %, 50 wt % to 70 wt %, 50 wt % to 60 wt %, 60 wt % to 90 wt %, 60 wt % to 80 wt %, 60 wt % to 70 wt %, and any and all sub-ranges formed by the foregoing end points.

In some embodiments, the reverse ion exchange bath may contain potassium nitrate ($KNO_3$). The $KNO_3$ in the reverse ion exchange bath may be the result of the same reverse ion exchange bath being employed for multiple reverse ion exchange cycles, with and potassium removed from the glass-based article poisoning the reverse ion exchange bath. The reverse ion exchange bath may contain less than or equal to 10 wt % $KNO_3$, such as less than or equal to 9 wt %, 8 wt %, 7 wt %, 6 wt %, 5 wt %, 4 wt %, 3 wt %, 2 wt %, or 1 wt % $KNO_3$. The reverse ion exchange bath may be substantially free or free of $KNO_3$.

In some embodiments, the reverse ion exchange medium may also contain soluble carbonate, phosphate, and sulfate species, for example less than 0.1 wt %. In some embodiments, the reverse ion exchange medium may also contain silicic acid, for example from 0.1 wt % to 4 wt %, 0.1 wt % to 3 wt %, 0.1 wt % to 2 wt %, 0.1 wt % to 1 wt %, 0.5 wt % to 4 wt %, 0.5 wt % to 3 wt %, 0.5 wt % to 2 wt %, 0.5 wt % to 1 wt %, 1 wt % to 4 wt %, 1 wt % to 3 wt %, 1 wt % to 2 wt %, 2 wt % to 4 wt %, 2 wt % to 3 wt %, 3 wt % to 5 wt %, 3 wt % to 4 wt %, and any and all sub-ranges therebetween. Silicic acid lowers the pH of the molten salt and also lowers the amount of multivalent metal salts in the molten salt. Without being bound by theory, it is believed the high pH of the molten bath may also contribute to the formation of haze so lowering the pH minimizes the haze. Also without being bound by theory, it is believed that the presence of excess multivalent metal salts in the reverse ion exchange medium may result in a lower compressive stress at the surface when the glass-base article is ion exchanged again in comparison to the compress stress at the surface before the reverse ion exchange process. In some embodiments, the silicic acid may be added to the reversed ion exchange medium after a molten salt is formed such that the silicic acid is added after the multivalent metal salt has reacted with the carbonate ions in the molten salt to lower the pH and/or remove the residual multivalent metal salts from the molten salt.

The reverse ion exchange bath composition may be determined based on the composition of the glass-based article before ion exchange. The appropriate reverse ion exchange bath composition may be determined based on the desired $Li_2O$ and $Na_2O$ content in the glass-based article. For example, the amount of lithium salt may be selected such that a ratio of the lithium salt to the content of a sodium salt in the reverse ion exchange bath is substantially similar to the ratio of $Li_2O$ to $Na_2O$ in the glass-based composition before ion exchange. The composition at the center of the chemically strengthened glass-based article may be employed as an approximation of the composition of the glass-based article before ion exchange, as in many chemical strengthening processes the center of the glass-based article does not undergo significant ion exchange.

The reverse ion exchange process may include the reverse ion exchange of the ion exchanged glass-based article in the reverse ion exchange bath for any appropriate time period. In embodiments, the reverse ion exchange may extend for a time in the range from greater than or equal to 1 hour to less than or equal to 48 hours, and any and all sub-ranges therebetween.

The reverse ion exchange bath may at any appropriate temperature when the single step reverse ion exchange of the ion exchanged glass-based article is carried out. In embodiments, the reverse ion exchange bath is at a temperature in the range from greater than or equal to 350° C. to less than or equal to 550° C., and any and all sub-ranges therebetween.

In some embodiments, the reverse ion exchange process includes one reverse ion exchange step and in other embodiments it includes multiple reverse ion exchange steps.

In some embodiments, after the reverse ion exchange process, the glass-based article has a transmission haze of less than 0.1% or less than 0.05%. As used herein, the terms "transmission haze" and "haze" refer to the percentage of transmitted light scattered outside an angular cone of about ±2.5° in accordance with ASTM procedure D1003, entitled "Standard Test Method for Haze and Luminous Transmittance of Transparent Plastics," the contents of which is incorporated by reference herein in its entirety. For an optically smooth surface, transmission haze is generally close to zero.

In some embodiments, after the reverse ion exchange process, the glass-based article has a surface roughness (Ra) of less than 5 nm as measured using an interferometer and a sample area of 200 microns by 200 microns. The interferometer used was a ZYGO® NEWVIEW™ 7300 Optical Surface Profiler manufactured by ZYGO® Corporation. The surface roughness is reported as a mean surface roughness.

In some embodiments, before the reverse ion exchange process, the glass-based article had a compressive stress of at least 200 MPa at the surface. In some embodiments, after the reverse ion exchange process, the glass-based article has a compressive stress of less than 100 MPa.

In some embodiments, the reverse ion exchanged glass-based article produced by the reverse ion exchange may have a $K_2O$ content at the surface that is higher than the $K_2O$ content at the center of the reverse ion exchanged glass-based article.

The glass-based articles described herein may be formed from glass compositions that are fusion formable. The glass-based articles described herein may be formed from any appropriate glass composition. In embodiments, the glass-based articles may be formed from an alkali aluminosilicate glass composition, borosilicate glass composition, or a silicate glass composition. The glass-based articles have a 2D, 2.5D, or 3D shape. In embodiments, the glass-based article comprises or consists essentially of from greater than or equal to 0.2 mol % to less than or equal to 10 mol % $Li_2O$.

EXEMPLARY EMBODIMENTS

The following non-limiting exemplary embodiments were produced.

Glass-based substrates having a thickness of 0.5 mm were prepared with the following composition, on an oxide basis: 63.70 mol % $SiO_2$, 16.18 mol % $Al_2O_3$, 8.10 mol % $Na_2O$, 8.04 mol % $Li_2O$, 0.39 mol % $B_2O_3$, 0.53 mol % $K_2O$, 0.33 mol % $MgO$, 2.64 mol % $P_2O_5$, 0.01 mol % $Ti_2O$, 0.02 mol % $Fe_2O_3$, and 0.05 mol % $SnO_2$ and were ion exchanged under the following conditions: preheated for 15 minutes at 300 Celsius, ion exchanged for 120 minutes at 385 Celsius in a 99 wt % $KNO_3$/1 wt % $NaNO_3$ bath, preheated for 15 minutes at 250 Celsius, and ion exchanged for 20 minutes at 370 Celsius in a 62 wt % $KNO_3$/38 wt % $NaNO_3$ bath After the ion-exchange they were heated at 300 Celsius for 15 minutes and they were then reverse ion exchanged under one of the following four conditions at 420 Celsius for 480 minutes. The samples were then taken out of the medium, cooled, and cleaned with deionized water.

| Condition | Bath |
|---|---|
| 1 | 34.5 wt % $LiNO_3$, 64.5 wt % $NaNO_3$, 1 wt % $KNO_3$, and 0.1 wt % $Na_2CO_3$ |
| 2 | 34.5 wt % $LiNO_3$, 64.5 wt % $NaNO_3$, 1 wt % $KNO_3$, 0.1 wt % $Na_2CO_3$, and 2 wt % $Ca(NO_3)_2$ |
| 3 | 34.5 wt % $LiNO_3$, 64.5 wt % $NaNO_3$, 1 wt % $KNO_3$, 0.1 wt % $Na_2CO_3$, and 1 wt % $Ca(NO_3)_2$ |
| 4 | 34.5 wt % $LiNO_3$, 64.5 wt % $NaNO_3$, 1 wt % $KNO_3$, 0.1 wt % $Na_2CO_3$, 2 wt % $Ca(NO_3)_2$, and 2 wt % silicic acid. |

When the samples under the various conditions were illuminated on the edge with light having a wavelength from 350 nm to 700 nm, significant haze was present for samples subjected to condition 1. Samples subjected to conditions 2-4 showed much less haze than those subjected to condition 1, showing that the presence of a multivalent metal salt reduced haze.

While typical embodiments have been set forth for the purpose of illustration, the foregoing description should not be deemed to be a limitation on the scope of the disclosure or appended claims. Accordingly, various modifications, adaptations, and alternatives may occur to one skilled in the art without departing from the spirit and scope of the present disclosure or appended claims.

The invention claimed is:
1. A method, comprising:
reverse ion exchanging an ion exchanged glass-based article in a reverse ion exchange medium to produce a reverse ion exchanged glass-based article, wherein the reverse ion exchange medium is a molten salt bath and the reverse ion exchanging comprises immersing the ion exchanged glass-based article in the molten salt bath, wherein the reverse ion exchange medium comprises a lithium salt, a multivalent metal salt and carbonate ions, and the reverse ion exchange medium comprises the multivalent metal salt in an amount in a range from 1 wt % to 2 wt %.

2. The method of claim 1, wherein the lithium salt is lithium nitrate.

3. The method of claim 1, wherein the multivalent metal salt is selected from the group consisting of nitrates, bromides, chlorides, sulfates and combinations thereof.

4. The method of claim 1, wherein metal of the multivalent metal salt is selected from the group consisting of calcium, magnesium, strontium, barium, iron, aluminum and combinations thereof.

5. The method of claim 1, wherein the reverse ion exchange medium further comprises a sodium salt.

6. The method of claim 5, wherein the reverse ion exchange medium comprises the sodium salt in an amount in a range from 30 wt % to 90 wt %.

7. The method of claim 1, wherein the reverse ion exchange medium comprises the lithium salt in an amount in a range from 5 wt % to 50 wt %.

8. The method of claim 1, wherein the reverse ion exchange medium further comprises a potassium salt.

9. The method of claim 8, wherein the reverse ion exchange medium comprises the potassium salt in an amount less than or equal to 10 wt %.

10. The method of claim 1, wherein the reverse ion exchange medium further comprises silicic acid.

11. The method of claim 10, wherein the reverse ion exchange medium comprises the silicic acid in an amount in a range from 0.1 wt % to 4 wt %.

12. The method of claim 1, wherein the reverse ion exchange medium is at a temperature of greater than or equal to 350° C. to less than or equal to 550° C.

13. The method of claim 1, wherein the reverse ion exchange in the reverse ion exchange medium extends for a period of greater than or equal to 1 hours to less than or equal to 48 hours.

14. The method of claim 1, wherein after the reverse ion exchange a surface of the glass-based article has a surface roughness (Ra) of less than 5 nm.

15. The method of claim 1, wherein after the reverse ion exchange a surface of the glass-based article has a transmission haze of less than 0.1%.

16. The method of claim 1, wherein after the reverse ion exchange a surface of the glass-based article has a transmission haze of less than 0.05%.

17. The method of claim 1, wherein the reverse ion exchange medium is characterized by $[CO_3^{2-}]<K/[Li^+]^2$, $[CO_3^{2-}]$ is the concentration of $CO_3^{2-}$ ions in the reverse ion exchange medium, $[Li^+]$ is the concentration of $Li^+$ ions in the reverse ion exchange medium, and K is the lithium carbonate equilibrium constant.

* * * * *